June 6, 1944. J. M. CHRISTMAN 2,350,386
EYEGLASSES
Filed May 15, 1940
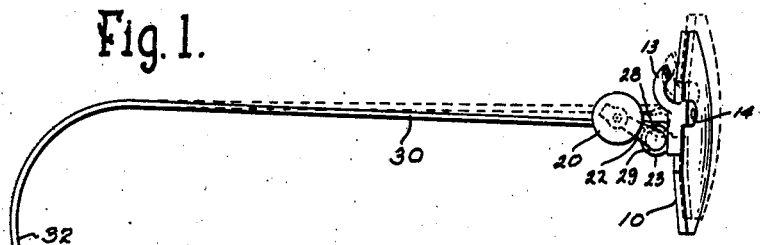
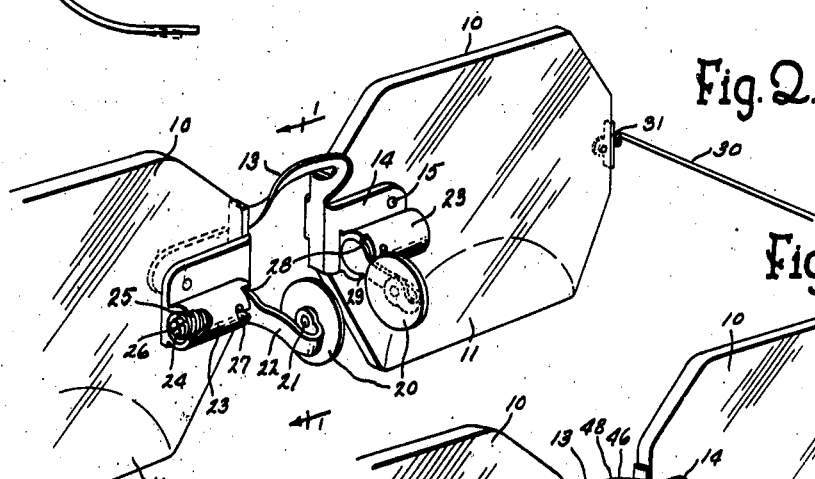
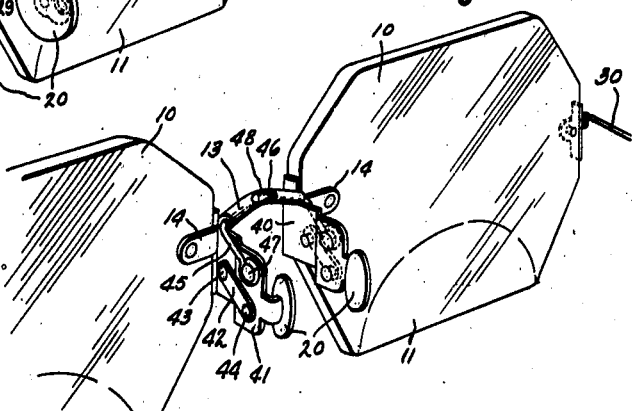
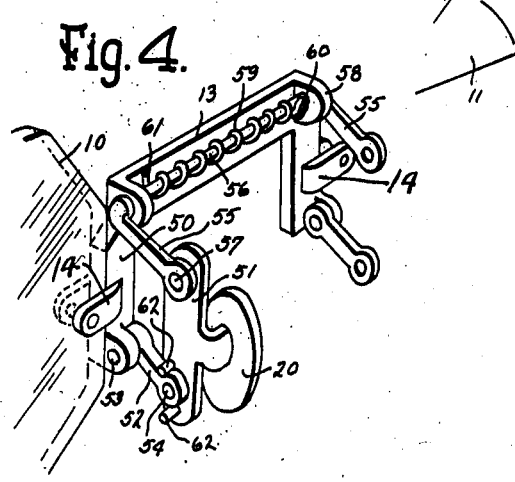
INVENTOR
John M. Christman
BY Milton Tibbetts
Atty Patented June 6, 1944

2,350,386

UNITED STATES PATENT OFFICE 2,350,386

EYEGLASSES

John M. Christman, Detroit, Mich.

Application May 15, 1940, Serial No. 335,362

6 Claims. (Cl. 88—49)

This invention relates to eyeglasses or spectacles and particularly to dual position glasses for bifocal lenses or lenses having different degrees of color or tint.

In the use of bifocal lenses in ordinary single position glasses much inconvenience is due to the necessity of tilting the head up or down to bring the reading lens or the distance lens into the line of vision of the wearer. This may be avoided by mounting the lenses so that they can be shifted from an upper to a lower position and back, but the dual position glasses heretofore provided have been seriously objectionable for various reasons.

Eyeglasses to be comfortable must be light in weight, the metal parts must be so formed that they are inconspicuous and so that they can be easily kept clean, and the joints, if any, must not be subject to undue side strain because they must of necessity be small. In dual position glasses for everyday use the construction must be such that the shift from one position to another can be made readily and quickly, and preferably with one hand. In some or all of these requirements previous dual position glasses have been woefully deficient.

It is an object of the present invention to provide dual position eyeglasses of simple lightweight construction, glasses in which the metal parts can be easily kept clean, glasses the metal joints of which work smoothly and last long, and glasses which can be quickly and with one hand shifted from upper to lower position and vice versa and which are yieldingly but not uncomfortably retained in either position.

Another object of this invention is to provide dual position eyeglasses with mountings which will admit of shifting the lenses as desired but which are at the same time not unduly noticeable when in either position but particularly when in the normal or lower position.

Other objects of the invention will appear from the following description taken in connection with the drawing, which forms a part of this specification, and in which:

Fig. 1 is a vertical section through a pair of eyeglasses made in accordance with the invention, the section being on the line 1—1 of Fig. 2;

Fig. 2 is a rear perspective view of the mountings of the eyeglasses shown in Fig. 1, with parts cut away to show the construction;

Fig. 3 is a similar view of another form of mounting;

Fig. 4 is a similar view of a third form of mounting.

Referring to the form of the invention shown in Figs. 1 and 2 of the drawing, the lenses of the eyeglasses are indicated at 10, these lenses being of the conventional bifocal type in which the reading or lower portion is indicated at 11. The separated lenses are connected by a bridge or yoke 13, preferably of inverted U-shape and having straps or clamps 14 fastened to the lenses as by screws 15.

Usually the nose pads of the eyeglasses are connected to the bridge but in this form of the invention the nose pads 20 are pivoted at 21 to arms 22 and these arms are pivotally supported on the lenses. As shown the rear parts of the clamps 14 are enlarged to form housings 23 and into these housings the pivot pins 24 of the arms 22 extend. Each pivot pin has a coil spring 25 surrounding it and this spring and the pivot pin fit closely in the barrel-shaped housing 23 so that the two can turn together in the housing, except that one end of the spring is secured to the end of the pin as by the end extending into a slot and the pin is peened over as shown at 26, and the other end of the spring is bent radially and enters the bayonet slot 27 in the housing. Thus the pin 24 and the spring 25 surrounding it can be assembled in the housing 23 and when the radial end of the spring enters the bayonet slot 27, as shown in Fig. 2, the pin and spring are removably retained in the housing. The housing 23 is provided with stops 28 and 29 to limit the swinging of the arm 22 on its pivotal support in the housing.

The spring 25 is of very light material and relatively numerous coils so that the movement of the arm in winding and unwinding the spring will not materially vary the tension from one to the other extreme of the movement. Also, the spring is so wound that it tends to press the arm downwardly which results in lifting the lenses relatively to the nose pads and thus assists in yieldingly retaining the lenses in an upper position. In other words, the springs tend to balance the weight of the lenses and to retain them in the upper or reading position.

With this mounting of the lenses it will be seen that the arms 22 will swing through an arc of about 90° and in doing so, with the nose pads held against the nose of the wearer, the lenses will move in an arc and at half-way position they will have moved away from the face of the wearer to some extent. In Fig. 1 the lens is shown in the lower position in full lines and in half-way position in dotted lines.

In addition to the spring 25 there is another means for yieldingly retaining the lenses in their upper position. This other means also yieldingly retains the lenses in their lower position. The eyeglasses have temple bars or bows 30 pivoted to the outer edges of the lenses as at 31 and these bows are flexible at their curved free ends 32 where they fit around the wearer's ears so that they tend to pull the glasses towards the wearer's face and tighten the pads 20 against his nose. With this construction, as the wearer moves the lenses from the lower to the upper position they first move outwardly somewhat, as shown in dotted lines in Fig. 1, and this pulls the bows 30 forwardly but yieldingly by reason of the curved part 32 as it is pulled around the ear. This is also indicated in broken lines in Fig. 1. As the arms 22 pass the horizontal position the yielding bows assist in finishing the upward movement of the lenses and then retain the lenses in the upper position where the eyeglasses are used for reading. In reversing the movement of the lenses the bows again yield as the arms pass dead center and then pull them back towards the wearer's face as the arms 22 contact the stops 28 and stop the movement at the required point.

In the form shown in Fig. 3, each of the clamps 14 has a plate 40 and each pad 20 has a plate 41, and these plates are connected by links 42 pivoted at 43 and 44 to the respective plates. Forming links parallel to the links 42 are wire links 45 each having spring arms 46 extending to the middle of the hinge or yoke 13 which in this case is shown as a tube with the arms 46 within it. These links 45 are pivoted at 47 to the plates 41 and their arms have their inner ends flattened as shown at 48 and pinced in the tubular bridge to retain them and prevent the ends from turning. The lenses are shown in their upper or reading position, the torsion spring action of the arms 46 assisting in yieldingly retaining them there. The lenses may be dropped to the lower position by swinging them on the parallel links 42, 45, against the action of the spring arms, and the bows, like the bows of Figs. 1 and 2, will hold them there. In both the upper and the lower position the plates 40, 41 will abut, thus limiting the swinging movement of the links.

In the form shown in Fig. 4 each clamp 14 has a plate 50 and each pad 20 has a plate 51 and these plates are connected, as in Fig. 3, by links 52 pivoted at 53 and 54. Parallel links 55 pivoted at 57 to the plates 51 are connected to a cross bar 56 mounted in bearings 58 in the bridge or yoke 13 which connects the lenses 10. A spring 59 surrounds the bar 56 and has one end connected to the bar as at 60 and the other end connected to the bridge as at 61 so that its tendency is to turn the bar and consequently lift the bridge and lenses relative to the nose pads. The parallel link motion obtained by this construction will permit a translatory or bodily movement of the lenses from the upper position shown to the lower position and vice versa, and the spring 59 assists in retaining the lenses in the upper position. Stops 62 limit the movement of the link 52. Bows similar to those of Figs. 1 and 2 act in the same manner as those bows.

It will be understood that various forms of the invention other than those described above may be used without departing from the spirit or scope of the invention.

What I claim is:

1. Eyeglasses comprising two lenses, a bridge connecting the lenses, nose pads, mountings connecting the nose pads with the lenses such that the lenses may be shifted to upper and lower positions relative to the nose pads and yieldingly urged to the upper of said positions, and additional means tending to yieldingly urge the lenses from an intermediate position to either of said upper and lower positions.

2. Dual position eyeglasses comprising two lenses, a bridge piece connecting the lenses and having a housing on each of the lenses, an arm pivoted horizontally and substantially parallel to the lenses in each of said housings, a nose pad on each arm, and coil springs in said housings surrounding the pivots of said arms tending to move the lenses upwardly relatively to the nose pads.

3. Dual position eyeglasses comprising lenses, a bridge connected to and relatively positioning the lenses, a nose pad for each lens, means connecting each nose pad to a lens for movement of one relative to the other comprising a housing mounted on the lens, an arm connected to the nose pad, said arm having a horizontal pivot pin extending into said housing, a coil spring surrounding said pin in said housing, one end of said spring being connected to the pin and the other end extending into a bayonet slot in the housing for retaining the pin in the housing.

4. Dual position eyeglasses comprising lenses, a bridge connecting the lenses, nose pads, parallel links at each side of the bridge connecting the bridge and the nose pads, a cross bar connected to two of said links and pivoted on the bridge at the rear thereof, and a coil spring surrounding said cross bar and having one end connected thereto and the other end connected to the bridge tending to raise the bridge and consequently the lenses to an upper position relative to the nose pads.

5. Dual position eyeglasses comprising lenses, means supporting the lenses in separated positions, nose pads, means interconnecting the nose pads and lenses for relative translatory movement on an arc up and down so that the lenses must move slightly away or forward from the nose of the wearer as they are shifted from one position to the other, spring means tending to move the lenses upwardly relative to the pads, and temple bars connected to the lenses and formed to fit over the ears of the wearer to yieldingly resist forward movement of the lenses.

6. Dual position eyeglasses comprising lenses, means supporting the lenses in separated positions, nose pads, means connecting the nose pads and lenses for free bodily movement over a limited range on an arc up and down so that the lenses must move slightly away or forward from the nose of the wearer as they are shifted from one position to the other, spring means at least partly balancing the weight of the lenses, and temple bars connected to the lenses and formed to fit over the ears of the wearer and to yieldingly resist forward movement of the lenses to thereby assist in retaining the lenses in position.

JOHN M. CHRISTMAN.